United States Patent [19]

Wolff et al.

[11] Patent Number: 4,915,898
[45] Date of Patent: Apr. 10, 1990

[54] METHOD FOR THE CONTINUOUS FABRICATION OF COMMINUTED HYDROGEN STORAGE ALLOY MATERIAL NEGATIVE ELECTRODES

[75] Inventors: Merle Wolff, Rochester; Mark A. Nuss, Rochester Hills; Michael A. Fetchenko, Royal Oak; Andrea L. Lijoi, Utica; Steven P. Sumner; Joseph LaRocca, both of Warren; Thomas Kaatz, Drayton Plains, all of Mich.

[73] Assignee: Energy Conversion Devices, Inc., Troy, Mich.

[21] Appl. No.: 308,289

[22] Filed: Feb. 9, 1989

Related U.S. Application Data

[63] Continuation-in-part of Ser. No. 185,598, Apr. 25, 1988, Pat. No. 4,820,481, and a continuation-in-part of Ser. No. 247,570, Sep. 22, 1988.

[51] Int. Cl.[4] .................................................. B22F 5/00
[52] U.S. Cl. ........................................ 419/3; 419/8; 419/23; 419/33; 419/53; 419/57
[58] Field of Search .................... 419/3, 8, 33, 53, 23, 419/57

[56] References Cited

U.S. PATENT DOCUMENTS 4,820,481 4/1989 Wolff et al. .............................. 419/3

Primary Examiner—Stephen J. Lechert, Jr.
Attorney, Agent, or Firm—Kenneth M. Massaroni; Richard M. Goldman; Marvin S. Siskind

[57] ABSTRACT

An improved method for the continuous fabrication of metal-hydride, electrochemical, hydrogen storage alloy, negative electrodes for use in rechargeable nickel metal hydride cells. The improved method comprises the steps of reducing the size of a high hardness, metal hydride, hydrogen storage alloy by shattering it along natural fracture line thereof. The process next includes providing measured amounts of powered metal hydride electrochemical hydrogen storage alloy material and disposing said material upon a continuous wire mesh screen substrate. Thereafter, the powdered metal hydride electrochemical hydrogen storage alloy and wire mesh screen are subjected to a compaction process wherein they are rolled and pressed so as to form a single integral electrode web which is subsequently exposed to a high temperature sintering process in a chemically inert environment. The sintering process is designed to drive off excess moisture in the material while discouraging oxidation of the electrode web and set the electrode web state of charge.

17 Claims, 5 Drawing Sheets

METHOD FOR THE CONTINUOUS FABRICATION OF COMMINUTED HYDROGEN STORAGE ALLOY MATERIAL NEGATIVE ELECTRODES

CROSS REFERENCE TO RELATED APPLICATIONS

This is a continuation-in-part of our commonly assigned copending U.S. application Ser. No. 185,598 filed Apr. 25, 1988 of M. Wolff, et al for AN IMPROVED METHOD FOR THE CONTINUOUS FABRICATION OF HYDROGEN STORAGE ALLOY NEGATIVE ELECTRODES, now U.S. Pat. No. 4,820,481, and our commonly assigned copending U.S. application Ser. No. 07/247,570 filed Sept. 22, 1988 of M. Fetcenko, et al for METHOD OF COMMINUTING PARTICULATE METAL HYDRIDE, HYDROGEN STORAGE ALLOY MATERIAL ALONG THE NATURAL FRACTURE LINES THEREOF.

FIELD OF THE INVENTION

The present invention relates generally to the manufacture of rechargeable electrochemical cells. More particularly, the present invention relates to an improved method for the continuous production of elongated, metal hydride, hydrogen storage alloy, negative electrode webs for rechargeable electrochemical cells, including a method for providing comminuted metal hydride hydrogen storage alloy material.

BACKGROUND OF THE INVENTION

Secondary cells using a rechargeable hydrogen storage negative electrode are known in the art. These cells operate in a different manner than lead-acid, nickel-cadmium or other prior art battery systems. The hydrogen storage electrochemical cell utilizes a negative electrode that is capable of reversibly electrochemically storing hydrogen. In one exemplification the cell employs a positive electrode of nickel hydroxide material, although other positive electrode materials may be used. The negative and positive electrodes are spaced apart in an alkaline electrolyte, and may include a suitable separator, spacer, or membrane therebetween.

Upon application of an electrical current to the negative electrode, the negative electrode material (M) is charged by the absorption of hydrogen:

$$M + H_2O + e^- \rightarrow M-H + OH^- \text{ (Charge)}$$

Upon discharge, the stored hydrogen is released to provide an electric current:

$$M-H + OH^- \rightarrow M + H_2O + e^- \text{ (Discharge)}$$

The reactions are reversible.

The reactions that take place at the positive electrode are also reversible. For example, the reactions at a conventional nickel hydroxide positive electrode as utilized in a hydrogen rechargeable secondary cell or battery are:

$$Ni(OH)_2 + OH^- \rightarrow NiOOH + H_2O + e^- \text{ (Charge),}$$
and
$$NiOOH + H_2O + e^- \rightarrow Ni(OH)_2 + OH^- \text{ (Discharge).}$$

A cell utilizing an electrochemically rechargeable hydrogen storage negative electrode offers important advantages over conventional secondary batteries. Rechargeable hydrogen storage negative electrodes offer significantly higher specific charge capacities (ampere hours per unit mass and ampere hours per unit volume) than do either lead negative electrodes or cadmium negative electrodes. As a result of the higher specific charge capacities a higher energy density (in watt hours per unit mass or watt hours per unit volume) is possible with hydrogen storage batteries than with the prior art conventional systems, making hydrogen storage cells particularly suitable for many commercial applications.

Suitable active materials for the negative electrode are disclosed in commonly assigned U.S. Pat. No. 4,551,400 to Sapru, Hong, Fetcenko and Venkatesan for HYDROGEN STORAGE MATERIALS AND METHODS OF SIZING AND PREPARING THE SAME FOR ELECTROCHEMICAL APPLICATION incorporated herein by reference. The materials described therein store hydrogen by reversibly forming hydrides. The materials of Sapru, et al have compositions of:

$$(TiV_{2-x}Ni_x)_{1-y}M_y$$

where $0.2 \times 1.0$, $0 \ y\ 0.2$ and $M = Al$ or $Zr$;

$$Ti_{2-x}Zr_xV_{4-y}Ni_y$$

where $0 \times 1.5$, $0.6\ y\ 3.5$; and $$Ti_{1-x}Cr_xV_{2-y}Ni_y$$

where $0 \times 0.75$, $0.2\ y\ 1.0$.

Reference may be made to U.S. Pat. No. 4,551,400 for further descriptions of these materials and for methods of making them.

Other suitable materials for the negative electrode are disclosed in commonly assigned U.S. Pat. No. 4,728,586 issued Mar. 1, 1988 in the names of Srinivasen Venkatesan, Benjamin Reichman, and Michael A. Fetcenko for ENHANCED CHARGE RETENTION ELECTROCHEMICAL HYDROGEN STORAGE ALLOYS AND AN ENHANCED CHARGE RETENTION ELECTROCHEMICAL CELL, incorporated herein by reference. As described in the above referenced application of Venkatesan, et al, one class of particularly desirable hydrogen storage alloys comprises titanium, vanadium, nickel, and at least one metal chosen from the group consisting of aluminum, zirconium, and chromium. The preferred alloys described in Venkatesan, et al are alloys of titanium, vanadium, nickel, zirconium, and chromium, especially alloys having the composition represented by the formula:

$$(Ti_{2-x}Zr_xV_{4-y}Ni_y)_{1-z}Cr_z$$

where x is between 0.0 and 1.5, y is between 0.6 and 3.5, and z is an effective amount less than 0.20.

The hydrogen storage alloy is formed from a melt. The production of hydrogen storage negative electrodes utilizing the preferred materials is difficult because these preferred materials are not only not ductile, but are in fact, of relatively great or high hardness. Indeed, these alloys can typically exhibit Rockwell "C" ($R_C$) hardnesses of 45 to 60 or more. Moreover, in order to attain high surface areas per unit volume and per unit mass, the alloy must be in the form of small ash or flake-like particles. In a preferred exemplification, the hydrogen storage alloy powder must pass through a 200 U.S. mesh screen, and thus be smaller than 75 microns in size (200 U.S. mesh screen has interstices of about 75 microns). Therefore, the resulting hydrogen storage alloy material must be comminuted, e.g., crushed ground, milled, or the like, before the hydrogen storage material is fabricated into an electrode.

Comminution of bulk ingots of metal hydride, hydrogen storage alloy material is made more difficult by the fact that the materials described hereinabove are quite brittle, and therefore do not easily break into particles of uniform size and shape. In commonly assigned, co-pending U.S. patent application Ser. No. 247,569 filed Sept. 22, 1988 the inventors disclosed an economical, safe, hydride-dehydride cycle comminution process for the initial size reduction of bulk ingots of hydrogen storage alloy material to flakes of about 80-100 mesh size. While this process is quite excellent for initial size reduction of hydrogen storage alloy, it is inadequate for the task of further comminuting particulate metal hydride, hydrogen storage alloy powder to particles of 75 microns or less (i.e., 200 mesh or less). The approximately 200-400 mesh size distribution has been experimentally determined to provide performance which is superior to other sizes of material in the negative electrode of metal hydride, hydrogen storage electrochemical cells.

Generally, it can be said that any method which can accomplish the objective of economical size reduction of the metal hydride material is a potential candidate. However, there are numerous characteristics of the material which require special handling instrumentation and precautions. These include: (1) inherent alloy powder hardness, i.e., approximately Rockwell "C" 60 hardness, consequently conventional size reduction processes of shear, abrasion and some kinds of impact such as ball mills, hammer mills, shredders, fluid energy, disk attrition are not very effective; (2) sensitivity to oxidation, such that comminution thereof must be done under an inert environment; this is for the dual reasons of providing a safe environment and maintaining acceptable electrochemical performance; (3) due to the crystal structure necessary for electrochemical activity, the microstructure of the material cannot be altered during grinding in an adverse manner, i.e., such as by atomization to produce powders directly from a melt; and (4) the particle size distribution; the size distribution must be a wide distribution with a maximum size of 75 microns (200 mesh), to provide superior electrochemical performance.

There are numerous methods for preparing metal powders. Since the alloys under consideration are at one stage molten, it might be considered that ultrasonic agitation or centrifugal atomization could be utilized on the liquid stream to prepare powders directly. This approach would not provide the desired alloy microstructure because the cooling rates are extremely fast. The atomization process also tends to provide a narrow distribution of particle size, which for this application is undesirable. Particle shape is also not optimal. Finally, it is difficult to provide a completely inert atmosphere, such that surface layers which are undesirable from an electrochemical outlook may be formed.

Another approach involves mechanical means. With conventional materials, ingots can first be crushed in a jaw crusher, followed by successively finer treatments until the desired particle size is achieved. As stated earlier, hydrogen storage materials are not amenable to these types of size reduction techniques due to the materials high hardness. Frequently, significant wear of the grinding medium is observed. A direct consequence of grinding media wear is the introduction of contaminants into the final powder. Iron and steel are well known contaminants which materially degrade performance in electrochemical cells of the type being considered.

Even if such mechanical means are contrived, it is difficult to attain the desired wide range of powder size since the materials are difficult to grind. A high fraction of powder just under the specified maximum value is frequently observed.

A further problem with conventional mechanical grinding means is observed during both unloading and cleaning of such equipment. The powder has a high surface area. In fact, the surface area of the comminuted material can render it pyrophoric. Thus, a hazardous condition exists for either fire or explosion if the comminuted material, oxygen, and an ignition source, such as a spark, should coincide. Thus, the grinding system must be relatively easy to clean and should be designed in such a way that residual powder can be minimized or eliminated. Thus, for example, although a high energy ball mill does in fact accomplish excellent size reduction, it is not practical, as powder becomes imbedded into the media, presenting a significant safety hazard during routine maintenance.

Also, grinding processes invariably have low yield factors, that is, an unacceptably high fraction of the feed stock of particulate metal hydride hydrogen storage alloy is oversized. After comminution, the material invariably requires classification to separate that material which is oversize. The process should be integrated such that the oversize powder is separated from the material within specification and accumulated to be rerun through the grinding system.

The comminution process should provide a wide distribution of particle size under the prescribed maximum. This distribution requires careful classification. An air classifier, or cyclone, can be considered. Problems occur because a cyclone tends to provide a narrow powder distribution, must be calibrated, and is subject to operating condition fluctuations. Further, a cyclone tends to use large quantities of gas as a carrier. Since inert gas must be used, it is potentially very costly. Consequently, other effective, cost efficient classification means must be considered.

For hydrogen storage materials used in electrochemical cells, it is desirable to have the powder as oxide free as possible. Consequently, all processing must be done in an inert environment. Generally, it can be said that the higher the temperature, the more sensitive the powder is to oxidation. Thus, it is desired that the integrated grinding/classification process be run in an inert environment, at the lowest temperature possible. If the temperature can be low enough for nitrogen to be used as the inert gas, there are substantial cost savings to be realized compared to argon gas.

In principle, fluid energy pulverizers have characteristics making this type of processing possible. The basic principle is to use the material to impact on itself for size reduction. Conventionally, the materials are contained in a gas stream which is under pressure, causing high speed impact of the material. From practical experience, this type of system did not work well. Size reduction was not accomplished with a high yield, large amounts of gas were required to accelerate the material and the equipment was not reliable.

It can thus be seen that heretofore the step of providing appropriately sized metal hydride, hydrogen storage alloy material has been a difficult one in the overall fabrication process of the metal hydride negative electrode.

One apparatus which may be adapted, with considerable reengineering of system operation parameter, to size reduce particulate metal hydride material, is shown in U.S. Pat. No. 4,641,787 to Peterson, et al. While the Peterson, et al comminution system is generally similar to that disclosed herein, providing powdered metal hydride hydrogen storage alloy material for subsequent fabrication of electrochemically rechargeable negative electrodes is not taught, suggested or disclosed therein. Further, the is no suggestion, teaching nor disclosure of using such a system to provide one step in an integrated fabrication process such as that disclosed hereinbelow.

Thereafter, the comminuted hydrogen storage alloy powder is applied to a suitable wire mesh or wire screen current collector to form a negative electrode. Various methods of manufacturing electrodes of strip configuration have been previously proposed and utilized, e.g. for cadmium negative electrodes. However, these methods and their associated equipment cannot be used with the high hardness, flake or ash-like active powdered hydrogen storage materials contemplated herein. For example, a system for making cadmium battery plates is suggested in U.S. Pat. Nos. 3,894,886 and 3,951,688. The system described therein utilizes an electrochemically active thioxotropic paste to carry the active material and is thus inapplicable to the herein contemplated and described negative electrode materials.

Another method of making silver strip electrodes involves feeding a free-flowing powder onto a moving paper carrier web. Vibrating doctor blades spread the powder on to the carrier to a pre-determined thickness. A grid structure or mesh is introduced to the powder and carrier. A single rolling mill compresses the grid and powder on the carrier, and thereafter the carrier is withdrawn. The remaining web of silver electrode material impregnated into a grid is then sintered. After the sintered silver electrode web leaves the sintering furnace, it is cut into strips for use in silver-zinc electrochemical cells.

The above described system cannot be used with the high hardness, powdered hydrogen storage alloy material herein, because the hydrogen storage alloy powder does not behave in the same way as the silver powder of the silver electrode production line. When the high hardness metal hydride powder used herein is compressed onto a paper carrier, the powder particles stick to and become embedded in the paper. Web tearing or other web damage can result. In addition, the hydrogen storage alloy electrode materials are typically deposited as a relatively thin layer of flake-like particles on a smooth, hard carrier. It has been found that doctor blades are ill-suited to provide a precisely controlled thickness or depth of powder, because the powder flakes or ash-like particles tend to agglomerate and build up in front of the blades. A powder layer of irregular thickness and density with regions of inadequate depth results. Uniformity of powder depth, and consequently uniformity of the amount of active material per unit area, is necessary to provide a uniform electrode strip. A uniform strip thickness is essential for battery electrodes if the battery is to have a uniform current density, and make efficient use of space within the cell.

Hydrogen storage electrodes for sealed cells have previously been prepared by various methods as described in, for example, U.S. Pat. No. 4,670,214 to Douglas Magnuson, Merle Wolff, Sam Lev, Kenneth Jeffries, and Scott Mapes for "METHOD FOR MAKING ELECTRODE MATERIAL FROM HIGH HARDNESS ACTIVE MATERIALS", the disclosure of which is incorporated herein by reference. The method disclosed therein is not however, altogether adequate for the most efficient method of continuously producing large area hydrogen storage alloy negative electrodes. Specifically, the previous method allowed the active negative electrode powder to be transported through an ambient environment to the fabrication apparatus on a temporary web, substrate or carrier means. Exposure to the atmosphere resulted in the oxidation of catalytically active sites in the active material. Additionally, the use of a strip of non-reusable, organic polymeric carrier material, such as, for example Mylar (a registered trademark of Dupont), to transport the active material to the mesh substrate and through the compaction process adversely affected electrode production in two critical ways: cost of manufacture and accuracy of production. Specifically, the carrier, since it was not reusable, added cost to the manufacture of the negative electrode. More importantly, the carrier had a tendency to deform in a non-uniform manner when subjected to roller mill compaction. This resulted in non-uniformities in the thickness of the electrode web after passing through the roller mills.

A further problem often encountered in the fabrication of hydrogen storage negative electrodes are the deleterious effects of oxygen and water. While alluded to above with respect to the transfer of the material to the compaction process, the problem is particularly acute during, and immediately after sintering. Oxygen and water cause the electrode material to be less functional by bonding to catalytic sites, thereby requiring more charge/discharge cycles to activate these sites. Additionally, oxygen and water react with the electrode material in the sintering process, lowering the ultimate electrode capacity. This necessitated purging the electrode web of oxygen and water. The preferred prior art method called for heat treating the electrode web in a large volume argon purged environment. This process of course required a significant economic investment in argon. The prior art also failed to make use of a controllable system for the incorporation of hydrogen in the electrode web, which hydrogen sets the charge state, i.e., partially charges the electrode web.

Finally, prior art continuous systems were subject to frequent mechanical failure as a result of the electrode web "walking". "Walking" is the lateral movement of the electrode web across the roller mills. This walking results in numerous tears and consequent splices in the electrode web, which is costly in terms of lost product, and is incompatible with apparatus used in subsequent downstream processing steps.

Accordingly, there exists a need for an improved method of fabricating metal hydride, hydrogen storage alloy negative electrodes, including steps directed towards providing appropriately sized hydrogen storage alloy powder.

SUMMARY OF THE INVENTION

Disclosed herein is a method of substantially continuously fabricating a large area metal hydride electrochemical hydrogen storage alloy negative electrode, for use in rechargeable nickel-metal hydride electrochemical cells. The improved method comprises the steps of providing a measured amount of powdered metal hydride electrochemical hydrogen storage alloy material by; (1) providing particulate metal hydride, hydrogen storage alloy material being less than about 75 to 100 mesh size, said material requiring further size reduction, in a substantially non-reactive gas atmosphere; (2) providing a high speed impact mill adapted to tangentially and radially accelerate said particulate metal hydride, hydrogen storage material placed thereinto, against an impact block concentrically disposed thereabout; (3) introducing the particulate metal hydride, hydrogen storage alloy material into the interior of the impact mill for comminution along the natural fracture lines thereof, while maintaining the interior of said mill in a substantially non-reactive atmosphere; (4) transporting the comminuted metal hydride, hydrogen storage alloy powder from the impact mill to classifying means in a stream of the substantially non-reactive gas; and (5) separating the gas from the comminuted metal hydride, hydrogen storage alloy powder, and separating oversized particles of said powder from those having a particle distribution below at least 200 mesh size, and averaging about 400 mesh (38 micron); and providing a substantially continuous wire mesh screen current collector substrate.

A layer of the powdered hydrogen storage alloy material is disposed, in an inert environment, substantially in contact with the wire mesh screen current collector substrate. The hydrogen storage alloy material and the wire mesh screen current collector are subjected to at least one compaction process, so as to incorporate the powdered hydrogen storage alloy material into the wire mesh screen current collector. After compaction the hydrogen storage alloy impregnated wire mesh screen current collector is preheated and then sintered. Sintering is carried out in a high temperature, substantially inert atmosphere containing hydrogen, e.g., 5 volumetric percent hydrogen. The preheating process liberates excess moisture in said materials, and discourages the oxidation of the active materials contained therein. Sintering then bonds the particles together. Subsequently, a partial charge to the electrode material is applied by exposure to controlled amounts of hydrogen during cooling of the electrode.

As used herein, mesh screen refers to U.S. standard mesh, wherein, for example, 200 U.S. mesh screen has interstices of about 75 microns, and 400 U.S. mesh screen has interstices of about 38 microns. Also, the term "natural fracture lines" refers to preexisting cracks and fissures present in the particulate metal hydride, hydrogen storage material, which cracks and fissures are generated, and partially propogated in a previous hydride-dehydride comminution process.

The material employed in the method of the instant invention is a vanadium, zirconium, titanium, nickel and chromium alloy having a preferred composition of $V_{22}Ti_{16}Zr_{16}Ni_{39}Cr_7$. The substantially non-reactive gas atmosphere which is required in the method of the is supplied by the provision of a non-reactive gas selected from the group consisting essentially of argon, neon, helium, nitrogen and combinations thereof, though in the preferred embodiment, the substantially non-reactive gas is either argon or nitrogen, which is fed into the apparatus employed in the method of the subject patent application at a rate of approximately 100 to 300 SCFH, and preferably about 200 SCFH. It is important to note that due to losses, i.e., leaks, vents, etc., which may occur in the gas recirculatory system of the apparatus employed in the method of the subject patent application, a supplemental supply of the non-reactive gas may be provided so as to maintain a substantially uniform flow of the non-reactive gas.

The high speed impact mill of the subject patent application is preferably a center fed, high speed rotor mill adapted to turn at a speed between 5,000 and 20,000 rpm, and preferably at a speed of about 10,000 rpm. The selection of the appropriate speed for the rotor is significant since variations in rotor speed will cause variations in the size reduction of particles introduced thereinto. The high speed impact mill must further be adapted to tangentially and radially accelerate particles of hydrogen storage alloy fed thereinto so as to achieve a velocity which will be sufficient to cause shattering of said particles along the natural fracture lines thereof for comminution to a size within a preferred range of sizes. Particles introduced into the impact mill are accelerated and thrust upon a concentrically disposed impact block, which impact block is in a preferred embodiment fabricated from tool steel or tungsten carbide.

After impact with the impact block, comminuted hydrogen storage alloy material is reduced to a fine powder which is transported, by a stream of the non-reactive gas, from the impact block to a classifying means. The transportation of said hydrogen storage alloy powder is achieved by employing a stream of said substantially non-reactive gas to carry said hydrogen storage alloy powder to the classifying means.

The classifying means preferably includes at least means for the separating substantially non-reactive carrier gas from the hydrogen storage alloy powder so that the substantially non-reactive gas is recirculated for subsequent use within a closed system. The hydrogen storage alloy powder is discharged into a vibratory screen classifier adapted to selectively and separately isolate particles of less than 200 mesh size from those of greater than 200 mesh size. In so doing, the oversized particles are separately collected in a first collection drum, while those with less than 200 mesh size are collected in a separate second collection drum. It is interesting to note that the particle size distribution of the hydrogen storage alloy powder is substantially all below 200 mesh size, and has an average particle size of about 400 mesh size.

The powder is placed in intimate contact with a wire mesh screen current collector substrate. The current collector may be a nickel mesh or a nickel plated steel mesh. The wire mesh screen is directed to the contact point by a series of steering devices adapted to prevent the mesh from wandering or "walking" thereby causing non-uniformities in the electrode web. Additionally, the active powder material should be kept in an inert, e.g., argon environment so as to discourage exposure to oxygen and water.

The wire mesh screen and powdered hydrogen storage alloy are next compacted in at least one and preferably two or more roll mill compactions of at least 16 tons per inch of width. After being exposed to said roll mill compaction processes, the powdered hydrogen storage alloy material becomes an integral part of the wire mesh screen, both of which are then trimmed and exposed to a preheating process and a high temperature, argon or argon-hydrogen atmosphere, sintering process. The preheat process takes place at temperatures sufficiently high to drive off excess moisture and to discourage oxidation in the wire mesh screen and the hydrogen storage alloy material. The sintering process is carried out at temperatures sufficiently high to promote particle-to-particle bonding and bonding of the powder to the current collector.

DETAILED DESCRIPTION OF THE INVENTION

Figure 1:
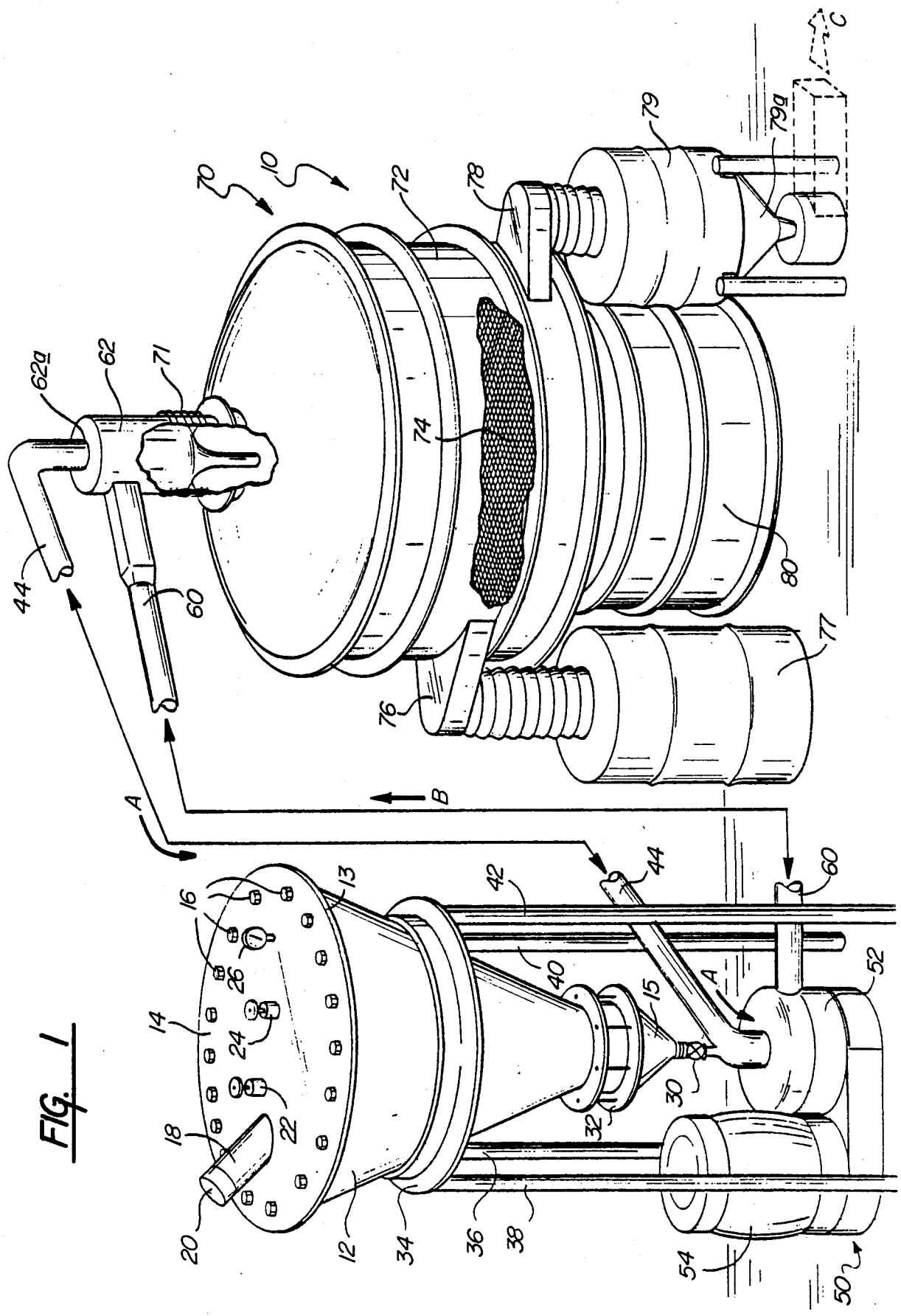
FIG. 1 is a schematic view of the comminution apparatus employed in the practice of one step of the method of the invention.

The first step in the fabrication of metal-hydride, electrochemical, hydrogen storage alloy negative electrodes is the production of the metal hydride, electrochemical, hydrogen storage alloy. The synthesis of the alloy begins with selection of precursor materials in their elemental form. Materials commonly employed in said synthesis are disclosed in the aforementioned U.S. Pat. No. 4,551,400, and include, but are not limited to titanium, zirconium, vanadium, nickel and chromium and thermally decomposable compounds thereof. These materials must be mixed in combined form so as to form a metal-hydride, hydrogen storage alloy suitable for use as a hydrogen storage negative electrode material in improved, metal-hydride rechargeable electrochemical cells.

The precursor materials are thoroughly mixed and subjected to conditions adapted to fabricate hydrogen storage alloys having the nominal composition $(Ti_{2-x}Zr_xV_{4-y}Ni_y)_{1-z}Cr_z$, where x is between 0.0 and 1.5, y is between 0.6 and 3.5, and z is an effective amount less than 0.20. The invention disclosed herein may be employed to fabricate electrodes of any metal hydride material such as, for example, lanthanum nickel type materials which may include modifiers and mischmetals. Measured amounts of the precursor materials are placed into a high temperature furnace such as an autoclave, to melt the materials under conditions to form a substantially homogenous ingot. Once the materials are placed in the autoclave, the autoclave is evacuated to a pressure of approximately $10^{-3}$ torr. The autoclave is then purged with an inert gas such as argon at a pressure of approximately one atmosphere. Thereafter, the autoclave is heated to a temperature sufficient to melt the elemental active materials contained therein.

The molten materials should be allowed to cool to solid ingot form prior to removal from the autoclave. After cooling, the ingot is removed from the autoclave and is comminuted. The first comminution step is generally a hydrogenation step wherein the ingot is placed in a vacuum pressure vessel and subjected to hydrogenation-dehydrogenation cycling. In one exemplification, the vacuum pressure vessel is evacuated to a pressure of approximately 10 millitorr and thereafter, hydrogen gas is added to the vacuum pressure vessel at a pressure sufficient to at least partially hydrogenate the ingot, e.g., a pressure of approximately 50 pounds per square inch. Hydrogenation of the alloy causes a cracking or pulverization of the ingot. This hydrogen exposure continues until complete, after which the vacuum pressure vessel is heated to approximately 400° Centigrade as it is evacuated to a low pressure so as to remove bonded hydrogen. After the hydrogen gas has been removed from the vacuum pressure chamber the comminuted product is allowed to cool down to room temperature in an inert environment. The resulting "rubble" is generally less than about one eighth ($\frac{1}{8}$) inch in size.

After hydrogen pulverization, the resulting powder must be further comminuted. As discussed hereinabove, this further comminution cannot be carried out by any conventional comminuting means, e.g., grinders, pulverizers or crushing apparatus. It is therefore necessary to provide a novel comminution apparatus adapted to reduce the particulate hydrogen storage alloy material to a powder of 200-400 mesh size.

Turning now to FIG. 1, there is illustrated therein an apparatus 10 adapted to carry out the comminution necessary to complete the method of the instant invention. The apparatus 10, includes a generally funnel-shaped dispenser 12 adapted to contain a supply of particulate metal hydride, hydrogen storage alloy material, in a substantially non-reactive gas atmosphere. The non-reactive gas, which prevents oxidation of the hydrogen storage alloy material, may be chosen from the group consisting essentially of helium, argon, neon, nitrogen and combinations thereof. The preferred non-reactive gas is nitrogen. The top 13 of the funnel-shaped dispenser 12 is sealed by a closure plate 14 affixed to said dispenser 12 by, for example, bolts 16 or a hinge-latch mechanism (not shown). Operatively disposed between the funnel-shaped dispenser 12 and closure plate 14 is a gasket seal (not shown) which assures a substantially air-tight seal. Closure plate 14 is further equipped with a loading tube 18 which allows particulate hydrogen storage alloy material to be loaded into said dispenser 12 without removing plate 14. The tube 18 may be sealed by seal cap 20 to assure atmospheric integrity within dispenser 12. Closure plate 14 further includes valves 22 and 24 adapted for connection to a gas purge/gas exit port (not shown) and a source of non-reactive gas (not shown) respectively. The plate 14 may further include measurement means 26 adapted to reflect certain conditions within dispenser 12, such as, for example, internal pressure, temperature or volume level.

The bottom end 15 of funnel-shaped dispenser 12, the end opposite said closure plate 14, (the narrow end of the funnel) is equipped with a flexible throttle valve 30 adapted to regulate the out-flow of particulate hydrogen storage alloy material to other parts of apparatus 10. The apparatus 10 may also include a vibratory mechanism 32 adapted to prevent particulate hydrogen storage alloy material from agglomerating in the neck of funnel-shaped dispenser 12 ahead of throttle valve 30. The funnel-shaped dispenser 12 is supported at a preselected height above the ground to allow an impact mill 50 to be operatively positioned therebeneath. The dispenser 12 is supported by collar 34 and legs 36, 38, 40 and 42.

The throttle valve 30 is operatively positioned between the bottom 15 of dispenser 12, and conduit 44 carrying a stream of non-reactive gas, traveling in the direction of arrow A, where suction is generated by the impact mill 50. The stream of gas is adapted to transport particulate hydrogen storage alloy material from throttle valve 30 to impact mill 50. Throttle valve 30 meters particulate hydrogen storage alloy material into the stream of non-reactive gas for transport to rotor housing 52 of impact mill 50. Impact mill 50 generally includes a rotor housing 52 and motor 54 operatively connected to rotor housing 52 via a series of pulleys (not shown).

Figure 2:
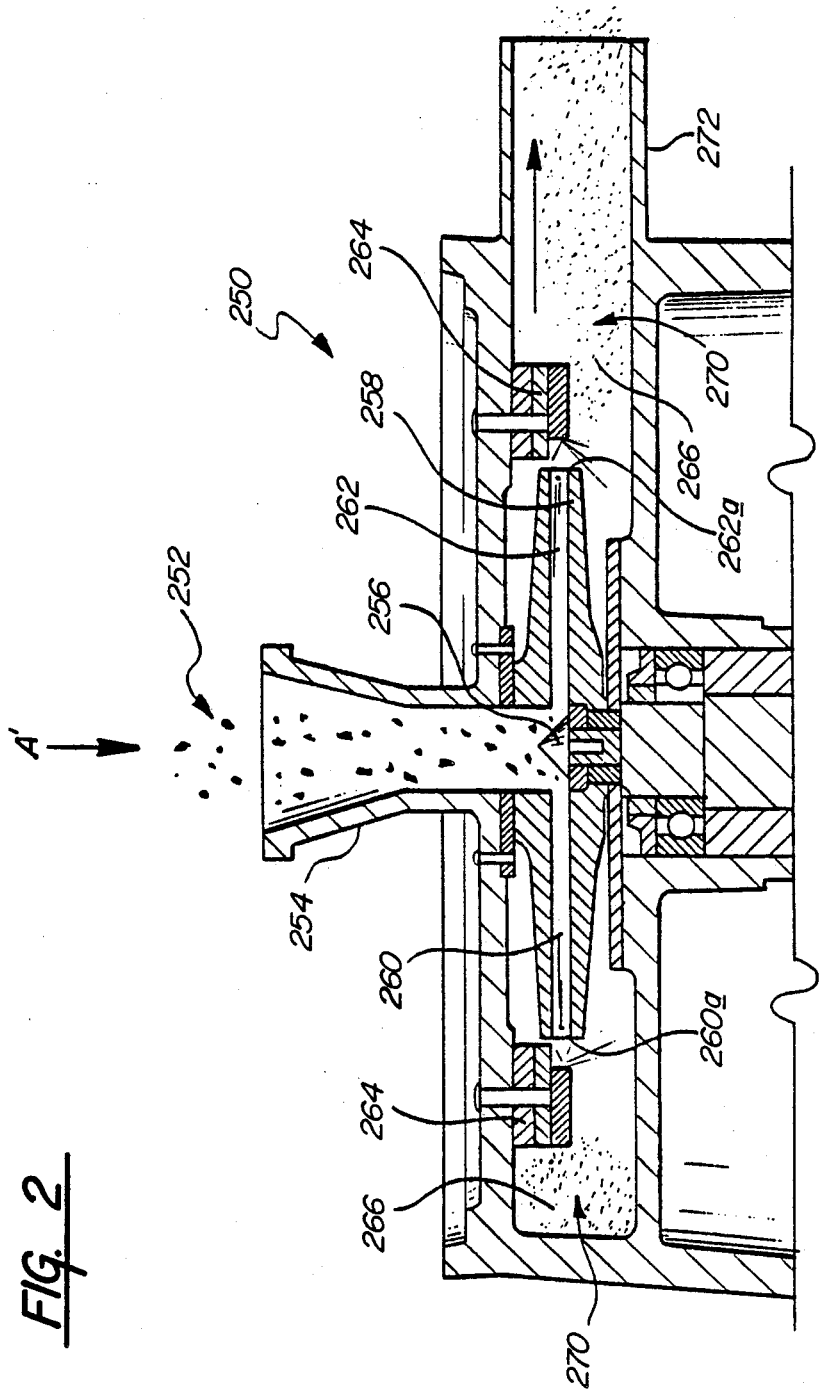
FIG. 2 is a side view, in partial cut-away of the high speed impact mill employed in the method of the subject patent application for size reduction of particulate hydrogen storage alloy material along the natural fracture lines thereof.

Turning now to FIG. 2, there is illustrated therein the interior 250 of rotor housing 52 of FIG. 1. In operation, particulate hydrogen storage alloy material herein 252 is transported into the interior of feed tunnel 254, in the direction of arrow A'; by the stream of non-reactive gas carried in conduit 44 of FIG. 1. The particulate material 252 is transported to the center 256 of rotor 258, and propelled outward through rotor channels 260 and 262. This propulsion is provided by the rotor and centrifugal force. In traveling outward through rotor channels 260 and 262, the particulate material is accelerated tangentially and radially to reach maximum velocity at the terminal ends 260a and 262a of the rotor channels 260 and 262. The particulate material exits the rotor channels 260 and 262 and is thrust against a tool steel, or tungsten carbide impact block 264 concentrically disposed around the outside diameter of the rotor 258. The rotor is rotated at between 5,000 and 20,000 revolutions per minute (rpm) and preferably at about 10,000 rpm by motor 54 of FIG. 1, which drives rotor 258 via a series of pulleys and belts (not shown). Rotor speed is an important consideration since speed variations result in variation in size reduction of the particulate material.

The particulate hydrogen storage alloy material is thrush upon impact block 264, and is shattered along its natural fracture lines, comminuting the 75-100 mesh particulate mesh to below 200 mesh hydrogen storage alloy powder 266, which is deposited in evacuation channel 270 for subsequent transport out of the rotor housing 52 of FIG. 1. Hydrogen storage alloy powder 266 is carried through evacuation channel 270 by the stream of non-reactive gas, and out of rotor housing 52 through exhaust port 272 in the direction of arrow B'. Besides transporting the hydrogen storage alloy powder out of the rotor housing 52, the flow of non-reactive gas serves to continuously cool both the equipment and the hydrogen storage alloy material, while keeping the mill itself clean.

Returning now to FIG. 1, the hydrogen storage alloy powder is swept by the stream of non-reactive gas out of the rotor housing 52 and into conduit 60, where it travels in the direction of arrow B, (approximately 5 feet vertically and 3 feet horizontally) to a discharge cyclone 62 adapted to separate the stream of non-reactive gas from the hydrogen storage powder. The non-reactive gas is directed through port 62a formed through cyclone 62 and into conduit 44 for recirculation to impact mill 50, in the direction of Arrow A. It is important to note that the non-reactive gas is provided at a rate of between 100-300 SCFH, and preferably at about 200 SCFH. This level was selected to provide a slight positive pressure to the closed system, thereby discouraging atmospheric contamination. The flow of non-reactive gas may be supplemented to assure a uniform flow, since losses may occur as a result of leaks in the closed system.

After the non-reactive gas is separated from the hydrogen storage powder in cyclone 62, the powder is discharged into a sifter 70 through flexible bellows 71. The sifter 70 is operatively disposed upon vibrating base 80 adapted to vigorously shake and vibrate sifter 70 to hasten the sifting process. The sifter 70 comprises a sifting tank 72 having a 200 mesh classifying screen 74, operatively disposed therein. Operatively disposed above screen 74 is a first, flexible collection chute 76 adapted to collect oversized particles which do not pass through classifying screen 74. Said oversized particles exit through chute 76 for collection in drum 77 for additional, subsequent size reduction. Disposed below screen 74 is a second, flexible collection chute 78 adapted to collect the hydrogen storage powder which passes through the 200 mesh classifying screen 74. This appropriately sized hydrogen storage powder may be collected in drum 79. Alternatively, a conveyor means 79a in phantom, may be employed to transport said powdered hydrogen storage alloy, in the direction of Arrow C, to, for example, a loss-in-weight feeder device such as 330 of FIG. 3. The conveyor means 79a may include, but is not limited to, screw means, belt means, or vibrating shaker means.

Thereafter, and referring now to FIG. 3, the 200-400 mesh hydrogen storage alloy powder is transported (as disclosed hereinabove with reference to conveyor means 79a of FIG. 1) in an inert environment, to a loss in weight feeder device 330. It is important to note that the material does not contain any binder material. Binder materials may degrade the mechanical or electrochemical integrity of the hydrogen storage alloy. This is in contradistinction to materials of the prior art which require the use of binder agents such as thioxotropic additives, or water and slurry mixes to hold the active material together during subsequent pressing and sintering steps.

As mentioned hereinabove, the powdered alloy material is introduced into a loss-in-weight feeder 330 which is connected to a microprocessing means 331 adapted to calibrate the rate at which active material is released by the loss-in-weight feeder 330. Active powder material released from the loss-in-weight feeder 330 passes through a feeder hose 332, and onto a vibrating chute assembly 333 which deposits measured amounts of active material powder at the loading nip 339 of a first roller mill assembly. The vibrating chute assembly 333 is mounted, both front and rear, with springs 334 adapted to prevent damping of the vibration of the chute assembly 333 as by other parts of the apparatus 310. The chute assembly 333 is flanked by housing 335 adapted to provide and contain a blanket of inert gas 336, e.g., argon. It is noteworthy that no cover or top is required on housing 335 to maintain the argon blanket 336 around and in contact with the powdered alloy. This is due to the fact that argon is heavier than air, and therefore remains substantially in the housing 335. The argon blanket 336 is contained above the trail of active material in the chute assembly 333. As mentioned hereinabove, lack of this argon blanket, as in prior art devices, resulted in the incorporation of oxidizing air and water in the web of electrode material, particularly since the hydrogen storage material is porous. These contaminants react with the alloy powder during the sintering process, thus resulting in lower quality electrodes.

The hereinabove mentioned microprocessing means 331 may be connected to downstream, feed monitoring devices (not shown) and is programmed to automatically adjust the powder delivery of the vibrating chute assembly 333 so as to deposit active powdered material in the loading nip 339 at a weight rate which provides the material at a highly uniform weight per unit area. Thus, as the throughput of the process increases, more active powdered material is delivered; and as the throughput slows down, less powder is provided. Thus, the loss-in-weight delivery mechanism deposits the powdered negative electrode hydrogen storage alloy active material in the loading nip region 339 at a highly uniform weight per unit area. In this way, a precisely controlled amount of powdered material is delivered to each measure of substrate area. It is noteworthy to point that no doctor blades, squeegees, or other imprecise adjustment devices are needed. In fact, devices such as these have been found to be unacceptable for the precise delivery of the types of materials that must be measured in an apparatus of this type. Additionally, the need for a carrier strip to transport active material to the mill is obviated since the active material is deposited directly upon the lower roller of a roller mill assembly. Further, the improved method allows for reduced chance of non-uniformities in the electrode web, and reduced overall production costs.

Figure 4:
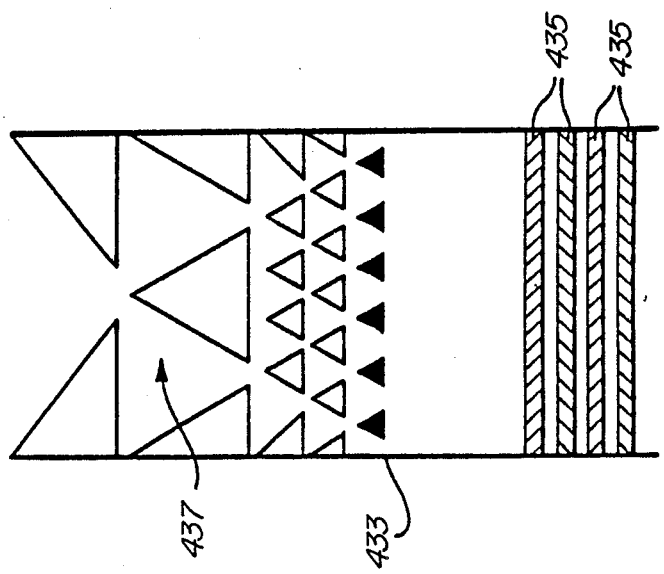
FIG. 4 is a top plan view of the vibrating chute assembly of FIG. 1, specifically illustrating the first divider means, a series of extending, descending triangles, and the second divider means, a series of transversely extending grooves, both adapted to assure uniform material distribution.

Turning now to FIG. 4, there is illustrated therein a top plan view of the vibrating chute assembly 433 of FIG. 1. Specifically, chute assembly 433 includes a plurality of material divider means adapted to distribute the trail of active electrode material in an even, uniform manner. The first material divider means typically takes the form of a plurality of triangular separators 437 ordered in a descending cascade array. Material first passes through these triangles 437 and is transported to the second material divider means, which takes the form of a plurality of transversely extending grooves 438. The grooves 438 are adapted to assure lateral distribution of active material prior to depositing the material in the loading nip region 339 of apparatus 310.

Returning now to FIG. 3, the continuous process apparatus 310 further pro ides a means for feeding the wire mesh screen current collector substrate 340 thereinto. The wire mesh screen current collector substrate 340 is, in this case, a continuous web of nickel mesh provided from a roll 341. It is important to note that the subject invention is not limited to the use of a nickel wire mesh. Other types of materials may be employed with equal success. Examples include steel and nickel plated steel wire mesh, as well as expanded metal or perforate sheet metal.

Figure 3:
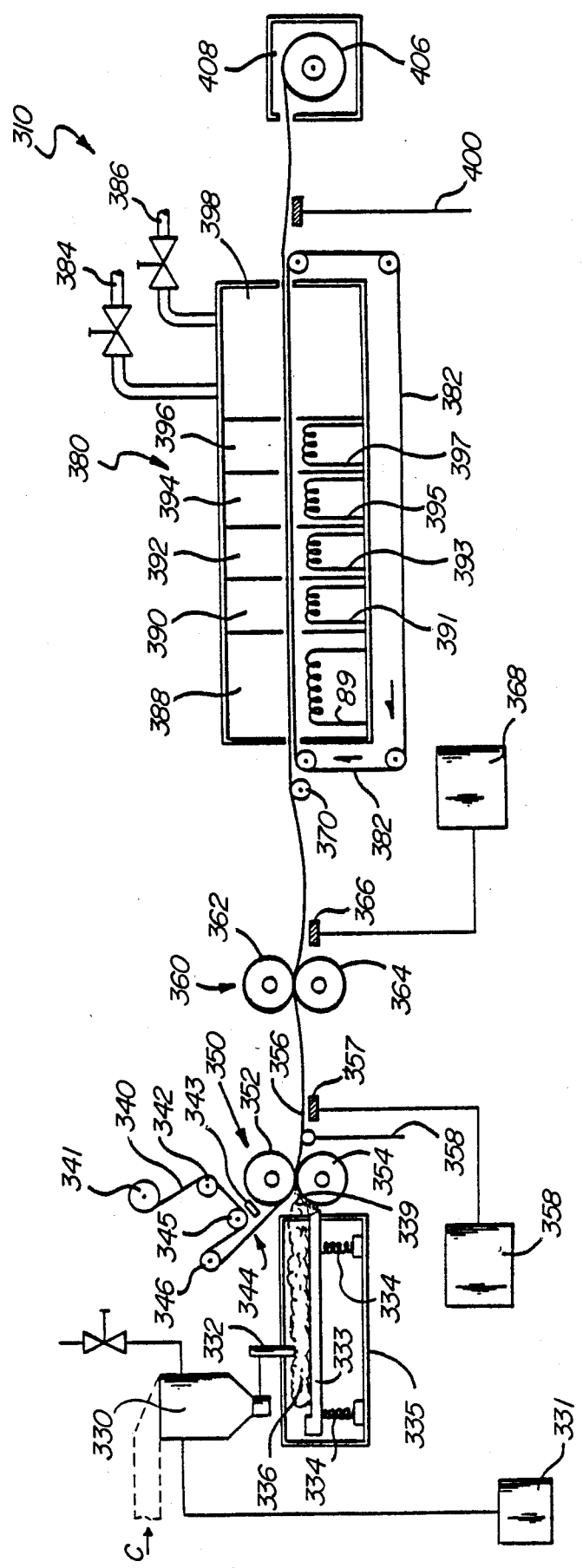
FIG. 3 is a stylized perspective view of an apparatus adapted to carry out the continuous fabrication of hydrogen storage alloy negative electrodes by the method disclosed herein.
Figure 5A:
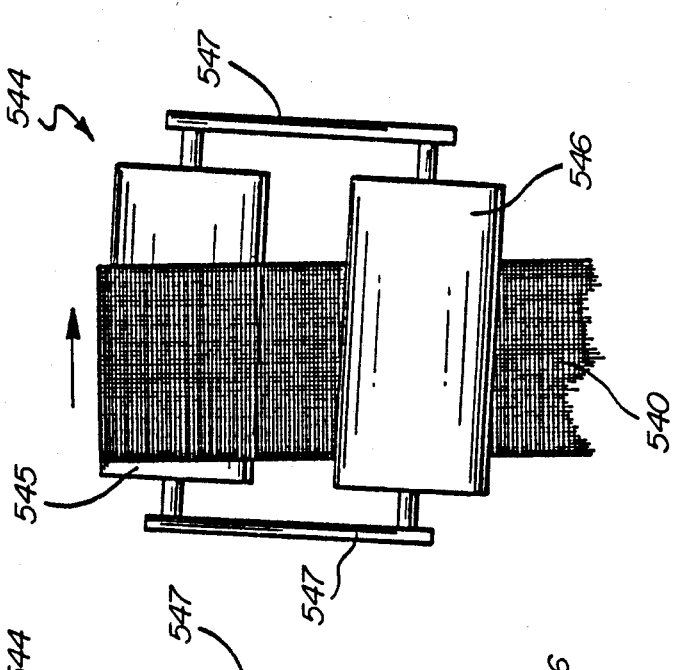
FIGS. 5A-5C illustrate several stylized perspective views of the steering mechanism employed to prevent the electrode web from laterally walking across the rollers of the apparatus.
Figure 5B:
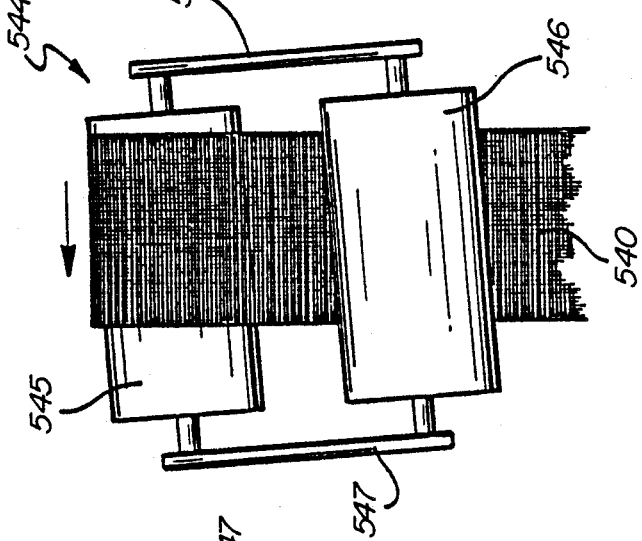
Figure 5C:
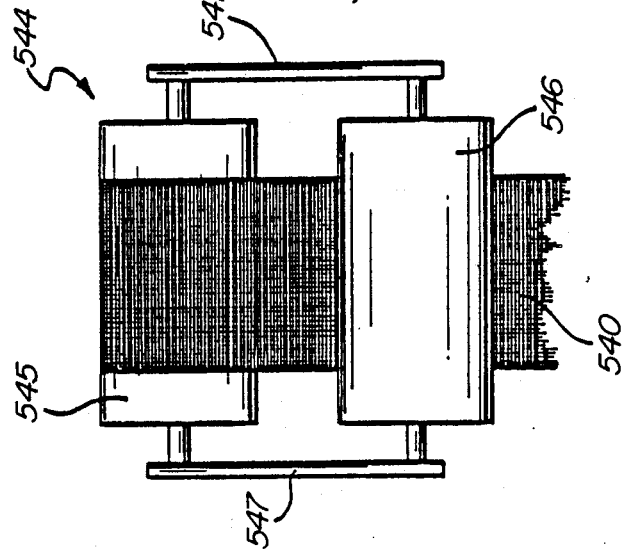

As is illustrated in FIG. 3, the wire mesh screen substrate 340 passes a fixed positioning roller 342 which roller 342 directs the wire mesh current collector substrate 340 past an electronic sensor 343, and vertically to positioning apparatus 344. Sensor 343 is adapted to monitor the lateral "position" of the wire mesh current collector substrate 340 as it enters the first roller mill 350. Sensor 343 is in electrical communication with a movable positioning apparatus 344, adapted to correct for substrate walk. FIGS. 5A-5C specifically illustrate the positioning apparatus 544. The positioning apparatus 544 consists of a pair of rollers 545, 546 adapted to pivotally change their position relative to the first roller mill 350 (of FIG. 3) so as to correct for substrate "walk". Referring specifically to FIG. 5A there is illustrated therein positioning apparatus 544 comprising rollers 545, 546, positioning blocks 547 and wire mesh current collector substrate 540 passing therethrough. In FIG. 5A, wire mesh substrate 540 is illustrated as correctly oriented with respect to rollers 545, 546 and thus, the rollers 545, 546 are positioned parallel to one another and perpendicular to the path of the substrate 540. As the wire mesh substrate 540 travels laterally to the right across rollers 545, 546, as is illustrated in FIG. 5B, the right end portions of roller 545, 546 pivot towards the substrate 540 while the left end portion of rollers 545, 546 pivot away. This in turn causes the wire mesh substrate 540 to travel back towards the center of rollers 545, 546. Similarly, in FIG. 5C, as the wire mesh substrate 540 moves to the left of rollers 545, 546 the rollers respond by pivoting so as to cause the substrate 540 to return to the preferred orientation. Once the wire mesh substrate 540 has returned to the preferred position, the rollers 545, 546 assume the orientation illustrated in FIG. 5A.

Figure 6:
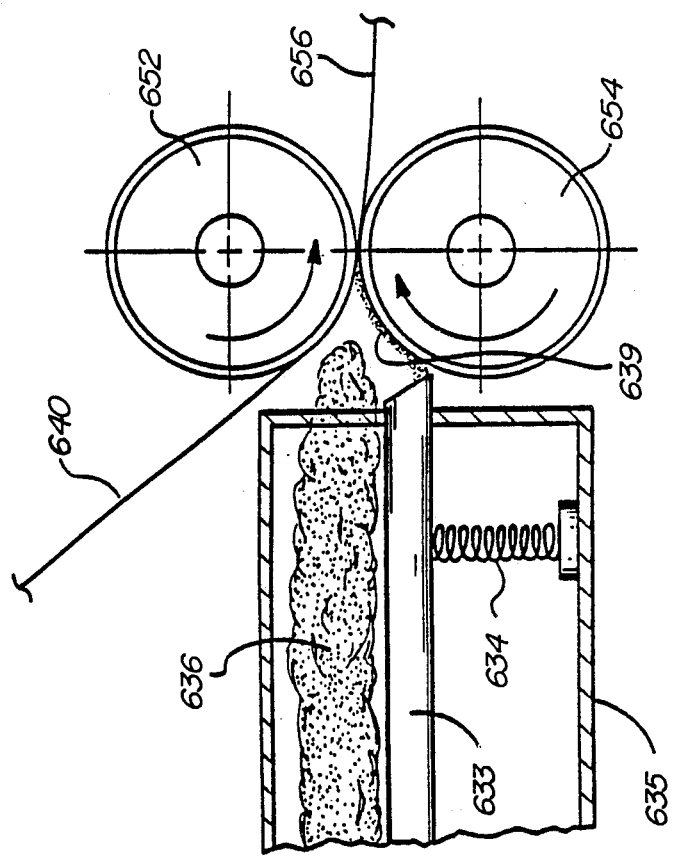
FIG. 6 is an exploded perspective view of the loading nip region, specifically illustrating the flow of active material onto the lower roller of the first roller mill which material is carried by said roller into contact with the wire mesh screen current collector, and through the first roller mill.

After passing roller 346 of FIG. 3, the wire mesh current collector substrate 340 is directed towards the loading nip region 339, where it meets the powdered active material at the nip 339 of the first of at least two roller mills, herein, 350 and 360. More particularly, and as is illustrated in FIG. 6 chute assembly 633 deposits the active material upon the lower roller 654 of the first roller mill 650, at a point before the wire mesh current collector 640 enters the roller mill 650. The lower roller 654 then advances the material into the mill, and into contact with the wire mesh current collector substrate 640. Alternatively, the wire mesh substrate 340 and positioning apparatus 344 of FIG. 3, may be located below apparatus 310, so that the active material powder is deposited directly upon the substrate 340 and the lower roller of roller mill 350. In accordance with one embodiment of this invention, the wire mesh screen current collector substrate 340 and the powdered active material are thereafter compacted together by a series of compaction roller mills into an electrode web.

Referring now to FIG. 3, the wire mesh current collector substrate 340 and the active powdered material pass through a first pair of rollers 352 and 354 of the first roller mill assembly 350. It is preferred that rollers 352 and 354 address each other with a roll force of at least 16 tons per inch of width thus compacting the incoming wire mesh substrate 340 and active powder. When compacted, the powdered material and substrate adhere in a continuous electrode web 356 having a controlled thickness as required for a given battery size. Examples of preferred electrode thickness range from approximately 5 to 30 mils.

The electrode web 356 is next exposed to a pair of trim wheels 359 adapted to trim excess wire mesh substrate 340 from the edges of electrode web 356. The first roller mill 350 is driven so as to provide a very small amount of slack. Slack sensors (not shown) may be interposed between roller mills 350 and 360 to sense the amount of slack provided, and to provide corresponding signals to the roller control microprocessor 358. The roller mills 350 and 360 do not operate at precisely the same speed because the powder and mesh being compressed therein deforms and elongates the electrode web 356 as it moves between the roller mills 350, 360.

Immediately thereafter the electrode web 356 passes an electric eye mechanism 357. The electric eye 357 is adapted to sense the thickness of the electrode web 356. Any deviation from the ideal or desired thickness is sensed by the electric eye 357 and relayed to an independent microprocessing means 358 which is in electrical contact with rollers 352 and 354. The independent microprocessing means 358 can thus affect a change in the relative position of said rollers with respect to one another. This allows the apparatus to turn out a continuous, electrode web of substantially uniform thickness. In another preferred embodiment, the rollers 352, 354 of the first roller mill 350 are preset to a desired orientation, and remain stationary thereafter, thus, eliminating the need for the electric eye 357.

It is important to note that the active material employed in the electrode web 356 is porous. Prior art systems allowed this material to be compacted in a roller mill having a conventional air environment, thereby trapping deleterious components such as air and water vapor within the material's pores, making contaminants difficult to remove. These deleterious components react with the materials in the subsequent sintering process, and further required a longer activation cycle to completely charge, i.e., activate the electrode. The present method incorporates argon into the pores of active material during the compaction process. Since argon is incorporated into the pores of the electrode web 356, less argon is required in a subsequent purge stage, thereby yielding a significant economic savings. Additionally, the higher quality electrode web 356 is more easily and quickly activated thus yielding further economic savings.

The electrode web 356 next enters the second roller mill 360. This second roller compaction is particularly preferred because the use of a single, large roller mill is relatively expensive as compared to two smaller roller mills. Two roller mills in series is believed to promote longer individual roller mill life. It is to be understood, however, that a single roller mill can be employed in this process. The second roller mill 360 is comprised of two rollers 362 and 364 which address each other with a roll force of at least 16 tons per inch of width of substrate. This second compaction increases the density of the active powdered material and the wire mesh screen current collector substrate 340. The second compaction also allows improved control and uniformity of electrode web 356 properties, particularly web thickness.

In another embodiment a second electric eye apparatus 366, (attached to a second microprocessing means 368) may be disposed adjacent to, e.g., beneath, the electrode web 356 immediately upon exiting the second roller mill assembly 360. The function of the second electric eye apparatus 366 and microprocessor 368 is the same as that of the first electric eye apparatus 357 described hereinabove. The electric eye 366 and microprocessor 368 monitor and sense the position of the electrode web 356 as it exits the second roller mill 360. Deviations from the desired position are detected, and corrections may be affected by changing the relative position of rollers 362 and 364. This is accomplished by the microprocessor 368, which is in electrical communication with roller 362.

Upon completing the second roller mill compaction process described hereinabove, the electrode web 356 passes into a multi-chambered sintering furnace 380. The sintering furnace 380 comprises a plurality of individual heating chambers, preferably at least four heating zones or chambers, adapted to sinter the electrode web 356 at high temperatures. It is preferred that some slack is provided between roller mill 360 and sintering furnace 380 so as to compensate for subtle speed variations between said operations. Prior to actually entering the high temperature sintering furnace 380, a position roller 370 is interposed along the course of the electrode web 356 so as to correctly direct electrode web 356 towards transport conveyor 382. The conveyor 382 is adapted to move the electrode web 56 through the sintering furnace without putting excessive strain upon it. The sintering process occurs in a substantially oxygen free anhydrous, argon-hydrogen atmosphere, preferably consisting of at least approximately 95 percent argon, balance hydrogen, and preferably, and approximately 98 percent argon, and 2 percent hydrogen by volume. The argon and hydrogen pressure in the atmosphere of the furnace 380 is provided by argon valve 384 and hydrogen valve 386 respectively. However, it is to be understood that other hydrogen/argon ratios can be used. The critical consideration is a sufficient amount of hydrogen to properly set the desired state of charge within the negative electrode while cooling. Safety steps however must be observed at higher hydrogen concentrations, i.e. such as gas burnoffs.

To avoid oxidizing the electrode web material 356, a sintering atmosphere within the furnace 380 is maintained substantially free of oxygen and water, usually both at less than 10 parts per million. Thus, a dew point of approximately minus fifty degrees centigrade and preferably at least minus 65 degrees Centigrade or less is maintained within the sintering furnace. This is necessary because moisture present in the sintering furnace adversely reacts with the electrode web 56. The small amount of hydrogen which is provided to the sintering furnace, among other functions, inhibits oxide formation on the active material of the electrode web 356, encourages reduction of residual oxygen in the atmosphere and sets the state of charge of the electrode web 356.

After passing on to the transport conveyor 382, the electrode web 356 enters into a first preheat zone 388 equipped with heating elements 389. In a preferred embodiment the pre-zone 388 is adapted to preheat the electrode web 356 to approximately 110 degrees Centigrade. The residence time of the electrode web 356 in the preheat zone 388 is approximately 10 to 20 minutes, and preferably approximately 15 minutes. It is to be understood, however, that the amount of time during which the electrode web 356 is subjected to a preheat environment may be varied without departing from the spirit or scope of the present invention. Upon exiting the preheat zone 388, the electrode web 356 passes into the first of a plurality of short sintering temperature zones. In a preferred embodiment the apparatus 310 comprises four short sintering zones, 390, 392, 394 and 396, each equipped with heating elements 391, 393, 395 and 397, respectively. The temperatures within said zones may vary from 800°–1100° centigrade, depending upon the residence time of the electrode web 356 within said zones and the exact composition of the alloy. It is preferred that the electrode web 356 be sintered over all four zones for a total of at least about 3 to 5 minutes, at a temperature of 900°–950° centigrade.

Thereafter, the electrode web 356 enters a cooling zone 398 of a suitable length, to allow cooling and partial hydrogen charging of the web 356. In a preferred embodiment, the cooling zone is approximately 30 to 50 feet long. To control the cooling rate of the web 356, the cooling zone 398 may be equipped with, for instance, a heat exchanger (not shown) having a lower water cooled element and an upper water cooled element located in close proximity to the hot electrode web 356. The cooling zone is further adapted to maintain the electrode web 356 in an anhydrous, oxygen free environment containing a controlled amount of hydrogen in a substantially argon atmosphere. In addition to the advantages described hereinabove, the hydrogen preferentially bonds to sites, e.g., electrocatalytic sites, in electrode web 356, thereby partially charging the electrode by chemical (as opposed to electrochemical) means. The advantage of gas phase chemical charging is that by partially charging the electrode web 356, the electrode web 356 enters cell assembly steps at a proper state of charge relative to the positive electrode, for proper cell balancing. The concept by which this chemical charging occurs is described in U.S. Pat. No. 4,716,088, issued Dec. 29, 1987, the disclosure of which is incorporated herein by reference.

The precise setting of state of charge for a metal hydride negative electrode, as described in the aforementioned '088 patent requires exceptionally accurate metering of the hydrogen gas, as for example by an MKS mass flow controller. This precise control is required since the actual hydrogen absorption rates are dependent upon a number of various factors, including for example: cooling rate from sintering temperatures; catalytic activity of the specific metal hydride material, which is itself dependent upon atmospheric contaminants; residence time of the electrode web 356 is the cooling zone 398; and partial pressure of hydrogen in the cooling zone 398.

In a preferred embodiment, the electrode web 356 is cooled from approximately 900° centigrade to less than 50° centigrade, and preferably about 25° centigrade, in approximately 15 minutes, which is the residence time of the web 356 in the cooling zone 398. Since the ends of the sintering furnace 380 are open to atmospheric conditions, the partial pressure must be controlled by volumetric flow rate. Given the preferred cooling rate, and a desired hydrogen content of about 0.02–0.08 weight percent hydrogen, a hydrogen concentration of about 3 volumetric percent is required. It is known that under the above described conditions, hydrogen content increases linearily with hydrogen flow rate.

The cooled and sintered web 356 then passes through an exit gate which may include a corresponding signal generation means to a take up roller control microprocessor. Again, it is desired that slack be provided in the web 356 and to that end slack controllers 400 may be located just downstream of the exit point from the sintering furnace 380. The electrode web 356 is then wound on a takeup roll 406, which takeup roll may be housed in a chamber 408, which is oxygen free and flooded with an inert gas such as argon. The completed roll 406 of negative electrode material may then be removed, stored in an nonoxidizing inert environment and transported to other sites for immediate battery manufacture, or stored free of degrading and deleterious oxidizing affects until such time as the material is needed.

In the preferred embodiment for the substantially continuous fabrication of a hydrogen storage alloy electrode web, the method includes the steps of: providing a continuous current collector substrate in the form of a nickel or nickel plated steel wire mesh screen; providing a measured amount of active, hydrogen storage alloy which alloy includes titanium, zirconium, vanadium, nickel and chromium; disposing said hydrogen storage alloy in contact with the current collector substrate in an inert environment and subjecting said alloy and substrate to at least two roller mill compactions of at least 16 tons pressure per inch of substrate width each; and sintering said materials in a sintering furnace which includes a plurality of individual preheating, sintering and cooling chambers.

EXAMPLES

In order to fabricate the metal hydride negative electrodes, it is necessary to provide appropriately sized hydrogen storage alloy material, employing the device shown in FIGS. 1 and 2 hereinabove. This example is provided to illustrate the fabrication of said material. Accordingly, three hundred thirty five pounds of particulate metal hydride, hydrogen storage alloy material having the nominal composition $V_{22}Ti_{16}Zr_{16}Ni_{39}Cr_7$ to be comminuted to metal hydride, hydrogen storage alloy powder for use in the negative electrode of hydrogen storage electrochemical cells was supplied for this example. Of the 335 pounds provided, 21 pounds comprised oversized material from previous processing according to a method of the instant invention. The size distribution of particulate hydrogen storage alloy provided for the comminution by the method of the instant invention was as follows:

| Dimension | Percentage |
| --- | --- |
| Greater than ¼ inch | 3.9% |
| Between ¼ and ⅛ inch | 3.7% |
| Between ⅛ inch and 60 mesh | 19.6% |
| Between 60 and 100 mesh | 14.3% |
| Between 100 and 275 mesh | 37.5% |
| Between 275 and 325 mesh | 15.5% |
| Between 325 and 400 mesh | 4.3% |
| Less than 400 mesh | 1.2% |

The material described hereinabove was loaded into the dispenser as shown in FIG. 1, which dispenser had previously been evacuated and purged with a non-reactive gas, in this case nitrogen. The hydrogen storage alloy powder was loaded into the dispenser and the entire system was allowed to purge for 60 minutes in nitrogen in order to provide an oxygen-free environment. Nitrogen was injected in the system at a rate of about 200 SCFH. Additional gas was fed into the system at several locations, at a rate of about 100 SCFH so as to replace gas lost to leaks and venting. That particulate hydrogen storage alloy material was allowed to be fed into the rotor housing of the impact mill at a rate of about 125 pounds per hour by means of the controllable throttle valve and vibratory feeder operatively disposed between the bottom of the dispenser, and the impact mill. The impact mill was adapted to operate at a speed of approximately 10,000 rpm with a high gas flow rotor and tool steel impact block.

Upon exiting from the rotor housing of the impact mill, the hydrogen storage allow powder was carried from said area through conduit 60 of FIG. 1 to the discharge cyclone wherein nitrogen was separated from said powder and was circulated via conduit 44 to the rotor housing. Hydrogen storage alloy powder was discharged into the vibratory screen sifter for classification according to the particle size of the powder. Of the 335 pounds of material processed, 93.5% passed through the 200 mesh screen provided in the vibratory sifter. The remaining 6.5% of the material was larger than 200 mesh and was accumulated, separately, in a collection drum and was included in feed stock of subsequent grinding run. Of the sample material classified as less than 200 mesh, the hydrogen storage alloy powder demonstrated the following size distribution:

| Dimension | Percentage |
|---|---|
| Between 200 and 325 mesh | 18.4% |
| Between 325 and 400 mesh | 20.6% |
| Less than 400 mesh | 60.8% |

While the invention has been described in connection with preferred embodiments and procedures, it is to be understood that it is not intended to limit the invention to the described embodiments and procedures. On the contrary, it is intended to cover all alternatives, modifications and equivalence may be included within the spirit and scope of the invention as defined by the claims appended herein and after.

We claim:

1. A method of substantially continuously fabricating a large area, metal hydride electrochemical hydrogen storage alloy negative electrode for use in a rechargeable nickel-metal hydride battery, said method comprising the steps of:
   (a) providing particulate metal hydride electrochemical hydrogen storage alloy material in a substantially non-reactive gas atmosphere;
   (b) providing a high speed impact mill adapted to tangentially and radially accelerate particles placed therein against an impact block;
   (c) introducing said particulate metal hydride, hydrogen storage alloy material into said impact mill for comminution along natural fracture lines of the material, while maintaining said non-reactive atmosphere;
   (d) transporting said comminuted metal hydride, electrochemical hydrogen storage material to a classifying means in a stream of said substantially non-reactive gas;
   (e) separating oversized particles from said comminuted material in said classifying means;
   (f) recirculating said non-reactive gas;
   (g) transporting said comminuted metal hydride electrochemical hydrogen storage alloy to a compaction means;
   (h) providing a continuous, wire mesh screen substrate to said compaction means;
   (i) providing a measured amount of the comminuted metal hydride electrochemical hydrogen storage alloy material to said compaction means;
   (j) continuously disposing a layer of the comminuted electrochemical hydrogen storage alloy material into contact with the wire mesh screen substrate, in a substantially inert atmosphere;
   (k) compacting the hydrogen storage alloy material into the wire mesh screen so as to form a green deposit thereof;
   (l) preheating the green deposit of hydrogen storage alloy-wire mesh screen;
   (m) sintering the green deposit of hydrogen storage alloy wire mesh screen in an anhydrous, substantially oxygen free inert atmosphere so as to liberate moisture therefrom; and
   (n) cooling said sintered hydrogen storage alloy wire mesh screen in a controlled hydrogen atmosphere so as to impart a partial charge thereto.

2. The method as recited in claim 1, wherein said metal hydride, hydrogen storage alloy material comprises an alloy of vanadium, zirconium, titanium, nickel and chromium, having a Rockwell hardness of between 45 and 60

3. The method as in claim 2, wherein said metal hydride, hydrogen storage alloy material has the composition:

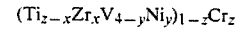

$$(Ti_{2-x}Zr_xV_{4-y}Ni_y)_{1-z}Cr_z$$

where x is between 0 and 1.5, y is between 0.6 and 3.5, and z is an effective amount less than 0.20.

4. The method as recited in claim 1, wherein the step of providing particulate metal hydride hydrogen storage alloy material comprises providing particulate material of about 75-100 mesh size.

5. The method as recited in claim 1, wherein said substantially non-reactive gas is selected from the group consisting of argon, neon, helium, nitrogen and combinations thereof.

6. The method as recited in claim 5, wherein the preferred substantially non-reactive gas is nitrogen.

7. The method as recited in claim 1, wherein said high speed impact mill is center-fed, high speed rotor mill adapted to turn at a speed of about 5,000 to 20,000 rpm, and preferably about 10,000 rpm.

8. The method as recited in claim 7, wherein said particulate metal hydride, hydrogen storage material and substantially non-reactive gas are fed into the center of said mill, for acceleration thereof into a concentrically disposed impact block.

9. The method as recited in claim 1, wherein said stream of substantially non-reactive gas is provided at a rate of 100-300 SCFH.

10. The method as recited in claim 1, including the further step of supplementing the non-reactive gas with make-up non-reactive gas.

11. The method as recited in claim 10, wherein said non-reactive gas is recycled for subsequent reuse.

12. The method as recited in claim 11, wherein the pressure of said non-reactive gas is uniformly maintained at a slight positive pressure.

13. The method as recited in claim 1, wherein the step of separating particles of said material in said classifying means includes the further steps of:
   (a) providing means for separating said substantially non-reactive gas from said comminuted hydrogen storage alloy material;
   (b) separating said non-reactive gas from said comminuted material;
   (c) providing a vibratory screen classifier as said classifying means; and (d) separately collecting classified of said hydrogen storage alloy material.

14. The method as recited in claim 13, wherein said hydrogen storage material is comminuted to a powder of less than about 200 mesh size.

15. The method as recited in claim 13, wherein said hydrogen storage material is comminuted to a powder averaging about 400 mesh, 38 micron size.

16. The method as recited in claim 13, wherein said means for separating said non-reactive gas from said comminuted material comprises a cyclone separator.

17. The method as recited in claim 1, wherein the step of providing particulate, metal hydride, hydrogen storage alloy material comprises the further steps of:
(a) providing a powder dispenser capable of maintaining an inert atmosphere, and operatively disposed to feed said hydrogen storage alloy material into said impact mill by gravity; and
(b) providing a regulating means operatively disposed between said impact mill and said powder dispenser to regulate the flow of said particulate material.

* * * * *